US011074284B2

(12) United States Patent
Cunico et al.

(10) Patent No.: US 11,074,284 B2
(45) Date of Patent: Jul. 27, 2021

(54) COGNITIVE SUMMARIZATION AND RETRIEVAL OF ARCHIVED COMMUNICATIONS

(71) Applicant: INTERNATIONAL BUSINESS MACHINES CORPORATION, Armonk, NY (US)

(72) Inventors: Hernan A. Cunico, Holly Springs, NC (US); Brett Gordon, Cary, NC (US); Harry L. Hoots, Raleigh, NC (US); Uma Maheshwar R. Chamakura, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 15/972,291

(22) Filed: May 7, 2018

(65) Prior Publication Data

US 2019/0340296 A1 Nov. 7, 2019

(51) Int. Cl.
*G06F 16/33* (2019.01)
*G06F 16/35* (2019.01)
*G06F 16/36* (2019.01)
*G06F 16/38* (2019.01)

(52) U.S. Cl.
CPC ........ *G06F 16/353* (2019.01); *G06F 16/3344* (2019.01); *G06F 16/36* (2019.01); *G06F 16/38* (2019.01)

(58) Field of Classification Search
CPC .... G06F 16/353; G06F 16/3344; G06F 16/38; G06F 16/36; G06F 40/205; G06F 16/334; G06F 40/279; G06F 16/345; G06F 16/383; G06F 16/387; G06F 16/355; G06F 16/338; H04L 51/36; H04L 65/403; H04L 51/22; H04L 51/16; G06Q 10/103; G06Q 10/109
See application file for complete search history.

(56) References Cited

U.S. PATENT DOCUMENTS

| 9,116,984 | B2* | 8/2015 | Caldwell | G06F 16/345 |
|---|---|---|---|---|
| 9,560,152 | B1* | 1/2017 | Jamdar | H04L 67/22 |
| 2003/0163537 | A1* | 8/2003 | Rohall | G06Q 10/107 |
| | | | | 709/206 |
| 2005/0235034 | A1* | 10/2005 | Chen | H04L 12/1831 |
| | | | | 709/206 |
| 2006/0195785 | A1* | 8/2006 | Portnoy | G06Q 10/107 |
| | | | | 715/700 |

(Continued)

OTHER PUBLICATIONS

Mell et al., "The NIST Definition of Cloud Computing," U.S. Department of Commerce, National Institute of Standards and Technology, Sep. 2011, p. 1-7, Special Publication 800-145.

(Continued)

*Primary Examiner* — Jorge A Casanova
(74) *Attorney, Agent, or Firm* — Robert D. Bean

(57) ABSTRACT

According to one embodiment, a method, computer system, and computer program product for summarizing and retrieving archived chat conversations is provided. The present invention may include grouping chat texts in chat text search results, in response to receiving a query in a chat text application, according to logical classifications of the chat texts, wherein the logical classifications are based on a plurality of chat text topics, a plurality of metadata associated with the chat texts, or both.

20 Claims, 7 Drawing Sheets

(56) References Cited

U.S. PATENT DOCUMENTS

| | | | |
|---|---|---|---|
| 2008/0235018 A1* | 9/2008 | Eggen | G10L 15/26 704/251 |
| 2009/0055481 A1* | 2/2009 | Carmel | G06Q 10/107 709/206 |
| 2010/0030781 A1* | 2/2010 | Wong | G06F 21/6227 707/783 |
| 2012/0179449 A1* | 7/2012 | Raskino | G06F 16/345 704/2 |
| 2014/0331150 A1 | 11/2014 | Griffin et al. | |
| 2015/0149929 A1 | 5/2015 | Shepherd et al. | |
| 2016/0191442 A1 | 6/2016 | Penilla et al. | |
| 2016/0357797 A1 | 12/2016 | Eagan et al. | |
| 2016/0380940 A1 | 12/2016 | Lan et al. | |
| 2017/0034226 A1 | 2/2017 | Bostick et al. | |
| 2017/0180294 A1* | 6/2017 | Milligan | H04L 51/02 |
| 2018/0018581 A1* | 1/2018 | Cook | G06F 40/30 |
| 2018/0367484 A1* | 12/2018 | Rodriguez | H04L 65/403 |

OTHER PUBLICATIONS

Su et al., "Exploring Text-based and Graphical-based Usable Interfaces for Mobile Chat Systems", vol. I No. 3, Dec. 2007, ISSN: 1697-9613 (print)—1887-3022 (online), www.eminds.uniovi.es, pp. 38-53.

Chen et al., "Realtime text chat via collaborative editing systems", The Fourth International Workshop on Collaborative Editing, ACM CSCW 2002, New Orleans, Louisiana, USA, Nov. 16, 2002, pp. 1-4.

Anonymously, "A method to insert messages in group chat history", An IP.com Prior Art Database Technical Disclosure, IP.com No. IPCOM000243990D, IP.com Electronic Publication Date: Nov. 4, 2015, pp. 1-10.

Anonymously, "System and Method to automatically identify and differentiate contents unique to a user in group chat sessions", An IP.com Prior Art Database Technical Disclosure, IP.com No. IPCOM000203803D, IP.com Electronic Publication Date: Feb. 2, 2011, pp. 1-5.

Anonymously, "Method for Improved Visibility and Effectiveness of Collaborative Instant Messaging Text Editing", An IP.com Prior Art Database Technical Disclosure, IP.com No. IPCOM000202199D, IP.com Electronic Publication Date: Dec. 8, 2010, pp. 1-6.

Anonymously, "Method to improve Instant Messaging (IM) chat interface to allow for hot edits of already entered text with edit history", An IP.com Prior Art Database Technical Disclosure, IP.com No. IPCOM000199093D, IP.com Electronic Publication Date: Aug. 25, 2010, pp. 1-2.

* cited by examiner

COGNITIVE SUMMARIZATION AND RETRIEVAL OF ARCHIVED COMMUNICATIONS

BACKGROUND

The present invention relates, generally, to the field of computing, and more particularly to digital chat communication.

Digital chat communication is the field concerned with real time transmission of text messages from sender to receiver. Such text messages are typically short and informal in order to facilitate quick response from other participants. Consequently, digital chat communication may bear a resemblance to a spoken conversation, which is what largely distinguishes chatting from other internet-based forms of text communication such as email or internet forums. Digital chat communication is often used in a collaborative fashion for business purposes, such as by employees or project members communicating with each other in furtherance of a business objectives; this allows multiple team members to communicate quickly and naturally despite differences in location, and has become increasingly important to the everyday functioning of teams, projects, and even entire companies.

SUMMARY

According to one embodiment, a method, computer system, and computer program product for summarizing and retrieving archived chat conversations is provided. The present invention may include grouping chat texts in chat text search results in response to receiving a query in a chat text application, according to logical classifications of the chat texts, wherein the logical classifications are based on a plurality of chat text topics, a plurality of metadata associated with the chat texts, or both.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
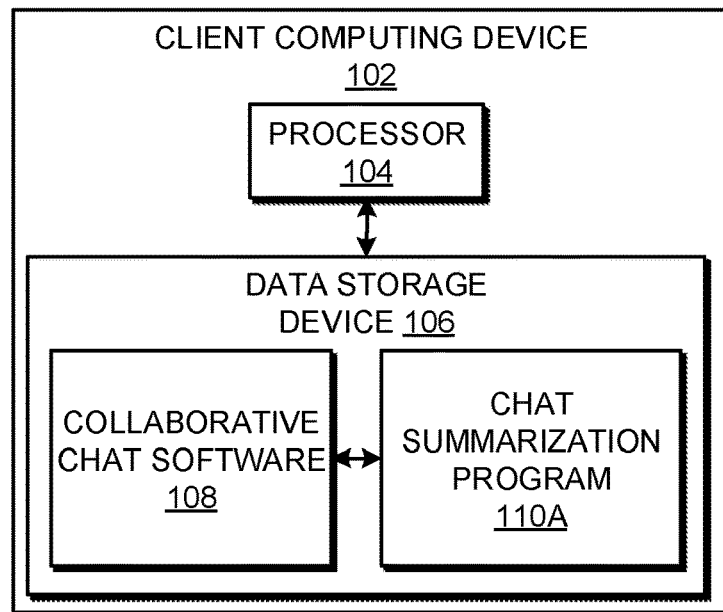
FIG. 1 illustrates an exemplary networked computer environment according to at least one embodiment.
Figure 1:
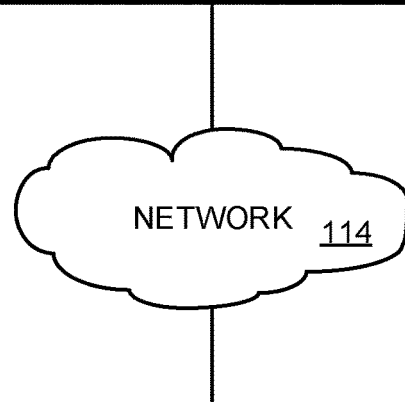
Figure 1:
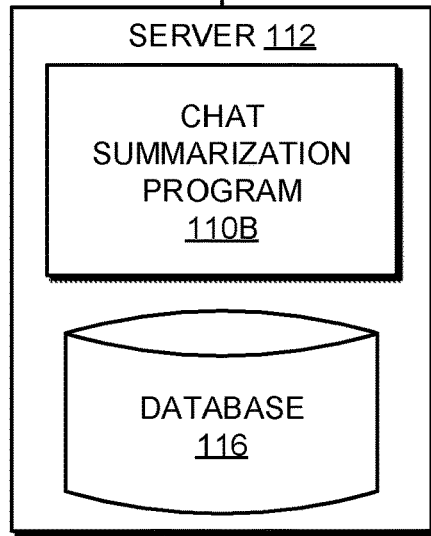

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to digital chat communication. The following described exemplary embodiments provide a system, method, and program product to, among other things, cognitively summarize and retrieve archived chat communications. Therefore, the present embodiment has the capacity to improve the technical field of digital chat communication by providing a more granular, efficient, and complete means of searching archived chat communications for important information, thereby facilitating communication and collaboration between groups and the more efficient completion of collaborative tasks.

As previously described, digital chat communication is the field concerned with real time transmission of text messages from sender to receiver. Such text messages are typically short and informal in order to facilitate quick response from other participants. Consequently, digital chat communication may bear a resemblance to a spoken conversation, which is what largely distinguishes chatting from other internet-based forms of text communication such as email or internet forums. Digital chat communication is often used in a collaborative fashion for business purposes, such as by employees or project members communicating with each other in furtherance of a business objectives; this allows multiple team members to communicate quickly and naturally despite differences in location, and has become increasingly important to the everyday functioning of teams, projects, and even entire companies.

Using persistent, collaborative chat software such as Slack® (Slack® and all Slack®-based trademarks and logos are trademarks or registered trademarks of Slack Technologies, Inc. and/or its affiliates) often involves dealing with numerous conversations per channel per day. This complexity may also be compounded by large numbers of participants in the chat. As a result, large amounts of chat content may be generated. Given this large amount of chat content, it is often difficult to find previous content from earlier conversations. Most chat software systems typically archive chat conversations monthly, and when prompted for retrieval of the archived chat history, return a chat history in full as it originally occurred on a given day. Some solutions can go a step further and highlight some questions that were raised during a conversation, but this sort of solution remains limited in scope and granularity. With current solutions, users are typically limited to finding information in the following fashion from the archived history: a user can make a keyword search if they happen to remember a word or phrase in the topic. This method often either fails to locate the desired information (for example, due to incorrectly remembering the appropriate key word when searching), or locates too much information (for example, searching for general keyword such as "defect" or a particular user name may yield too many results to be useful). Alternately, the user can manually scan the un-archived history to find the information they need, but this process is time consuming and inefficient given the large volume of the chat content. Additionally, users can easily miss the content they seek if searching too fast or if they are tired or otherwise cognitively impaired. As such, it may be advantageous to, among other things, implement a cognitive solution that will understand what was discussed within a chat, and who was involved, in order to allow for easier, more efficient retrieval of desired portions of past chat conversations.

According to one embodiment, the invention is a cognitive system to improve the ability to find information from past chat history by grouping the lines of chat into logical topics, summarizing those topics, and then tagging them. Several elements may be provided in this embodiment; one may be determining and compiling the relationship between lines of text in a chat; another may be interpreting the text to summarize it, and tag its content; and another may be interpreting the text to generate actions based upon sentiment. As an example, a chat conversation provided to the system may look like this:

----- 3/6/2017 -----
1. MT: The build server just went down (again).
2. RL: Does anyone know how to fix error ABC?
3. AR: The best way to fix ABC is:
4. AR: set this flag in your props.file
5. AR: rebuild the source code.
6. AR: Exit Eclipse
7. AR: and finally re-open Eclipse.
8. AR: Problem should be gone.
9. RL: Thanks @AR, That fixed the problem.

The invention system may summarize the above chat conversation and provide metadata tags as follows, to distinguish the two distinct topics being discussed:

Topic Summary: The build server went down again; Tag: server_down

Topic Summary: There is a fix for problem ABC; Tag: fix_for_problem_ABC

The chat software may display the topic summary and tags in response to a request to un-archive the history which would take up less space than the original chat conversation and also make it easier to do a manual scan for the information needed. As an example, the archived information may be represented by its summary and metadata, as follows:

----- 3/5/2017 ----- (Archived)
The build server went down again. server_down
----- 3/6/2017 ----- (Archived)
The build server went down again. server_down
There is a fix for problem ABC. fix_for_problem_ABC
----- Today -----
MT: hi all
RL: its another day WFH day for me—still snowed in!

Additionally, a user can search based on a tag to find information spreading over multiple archival periods. So for example a search for tag server_down might result in the system showing information from 3/5 and 3/6 where there is related content, as illustrated below:

----- 3/5/2017 -----
The build server went down again. server_down
----- 3/6/2017 -----
The build server went down again. server_down The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to cognitively summarize and retrieve archived chat communications.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a collaborative chat program 108 and a chat summarization program 110A and communicate with the server 112 via the communication network 114, in accordance with one embodiment of the invention. Collaborative chat program 108 may be any program capable of conducting informal text-based chatting, particularly instant messaging, between multiple users. Collaborative chat program 108 may further be capable of storing chat conversations for later retrieval, and may archive the conversations based on date. Exemplary collaborative chat programs may include Slack® or Watson® Workspace. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a chat summarization program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the chat summarization program 110A, 110B may be a program enabled to cognitively summarize and retrieve archived chat communications. The chat summarization and retrieval method is explained in further detail below with respect to FIG. 2. The chat summarization program 110 may be a discrete program or it may be a subroutine or method integrated into collaborative chat software 108. The chat summarization program 110 may be located on the host computing device 102, on server 112, or on any other device located within network 114. Furthermore, chat summarization program 110 may be distributed in its operation over multiple devices, such as host computing devices 102 and servers 112.

Figure 2:
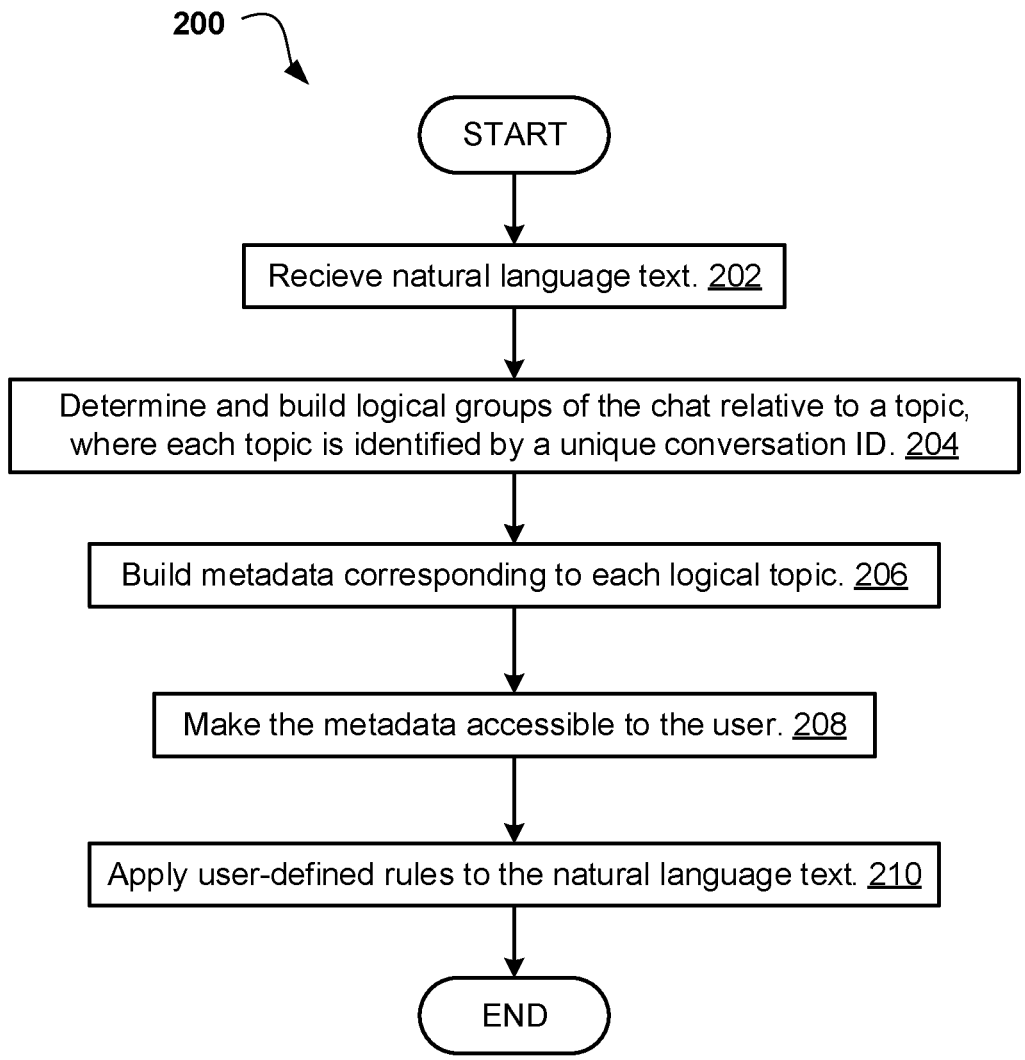
FIG. 2 is an operational flowchart illustrating a chat summarization and retrieval process according to at least one embodiment.

Referring now to FIG. 2, an operational flowchart illustrating a chat summarization and retrieval process 200 is depicted according to at least one embodiment. At 202, the chat summarization program 110A, 110B receives natural language text.

Next, at 204, chat summarization program 110A, 110B determines and builds logical groups of the chat relative to a topic, where each topic is identified by a unique conversation ID. Here chat summarization program 110A, 110B may use natural language processing and semantic analysis techniques to analyze the content of the chat and determine the relationship between multiple lines of chat text within a given block of a particular conversation. The chat summarization program 110A, 110B may extract the key topics discussed by grouping the lines of chat together with a conversation ID, where the conversation ID may be a unique identifier assigned to each topic occurring within the chat conversation. Lines of the chat which are related by topic may be assigned the same conversation ID, thus grouping the lines of chat by topic. In some embodiments, direct @mention or timestamp analysis of chat-line entry creation may be utilized with the natural language or semantic processing to add additional accuracy when building logical groups and assigning the conversation ID. In some embodiments, chat summarization program 110A, 110B may analyze the emotion of each line of chat. For example, where conversation participants are frustrated over a server shutdown, chat summarization program 110A, 110B may determine that the emotion of the topic of the server shutdown is angry, or heated. The chat summarization program 110A, 110B may analyze the emotion of a topic of conversation by assigning or receiving assigned values to a word or phrase corresponding with the most likely emotion to be associated with that word or phrase. In addition, chat summarization program 110A, 110B may use context analysis to more accurately determine the emotional impact of words or phrases in a chat conversation based on their position within the conversation, syntax, or other context clues.

At 206, chat summarization program 110A, 110B builds metadata corresponding to each logical topic. Metadata may include any data associated with primary data. For example, the primary data may be chat text. The metadata associated with the chat text may be the chat text's logical topic. Logical topic and other metadata may be appended to or otherwise associated with the chat text, to aid in retrieval and user searches, and may include summaries and search tags. Here, chat summarization program 110A, 110B may build a summary and the tags associated with the content of the chat conversation by using techniques of natural language processing and semantic analysis. The summary may be a short phrase or sentence which succinctly articulates the contents of the conversation topic. The tags may be words or phrases that emphasize elements of a topic or conversation that a user may wish to search for, for instance key topics, the participants of the conversation, and the timeframe at which each line of chat is created. The chat summarization program 110A, 110B may process all chat text associated with the group attached to a single conversation ID to determine a summary based on semantic analysis of that conversation ID's chat content. Tags may be constructed from the semantic analysis of the summary. In some embodiments, users may contribute to the semantic analysis or construction of tags, for example via prompts displayed to them. In some embodiments, the metadata may include the emotion of each line of chat, or the overall emotion of a topic or conversation. For example, for a conversation about a server shutdown where chat summarization program 110A, 110B has determined that participants are primarily angry, the tag "angry" might be added to the metadata to represent anger as being the overall emotion of the conversation. Alternately, chat summarization program 110A, 110B may average the values representing various emotions assigned to each word or phrase of the topic or conversation, and assign an overall emotion or multiple emotions to the conversation based on which emotion or emotions scored the highest on average.

At 208, chat summarization program 110A, 110B makes the metadata accessible to the user. Here, chat summarization program 110A, 110B may allow the metadata to be displayed, manually scanned, and searched in response to a request from a user. For example, chat summarization program 110A, 110B may display a graphical user interface (GUI) where clicking summaries or labels will result in retrieving the logical grouping of chat text. In embodiments where the emotion of a topic is considered, the chat summarization program 110A, 110B may color code chat information to reflect the sentiment within a given topic. Additionally, here chat summarization program 110A, 110B may prompt a user to input rules, where rules may be any explicit directive that modify the conduct of chat summarization program 110A, 110B.

At 210, chat summarization program 110A, 110B applies user-defined rules to the natural language text. Here, chat summarization program 110A, 110B may perform rules predefined by a user against the chat data. Examples of a rule may include color coding the status of a conversation thread based on its emotion; for instance, if the thread had certain emotion (anger, frustration . . . ) and has been inactive for X number of days/hours/minutes, the system could dispatch a notification to all participants involved in that thread to resume conversation. Alternately, if the thread had a certain emotion (happy, neutral . . . ) and had been inactive for X number of days/hours/minutes, the system could dispatch a notification to all people involved in that thread that the thread is being marked for archival. In another example, chat summarization program 110A, 110B may look for unanswered questions and take specific actions; for instance, following up with whoever posted the question via an automated message, such as a checkbox. If the user who posted the question does not respond to the first automated message, the rule may specify that a second automated message be sent after a predefined period of time.

Figure 3A:
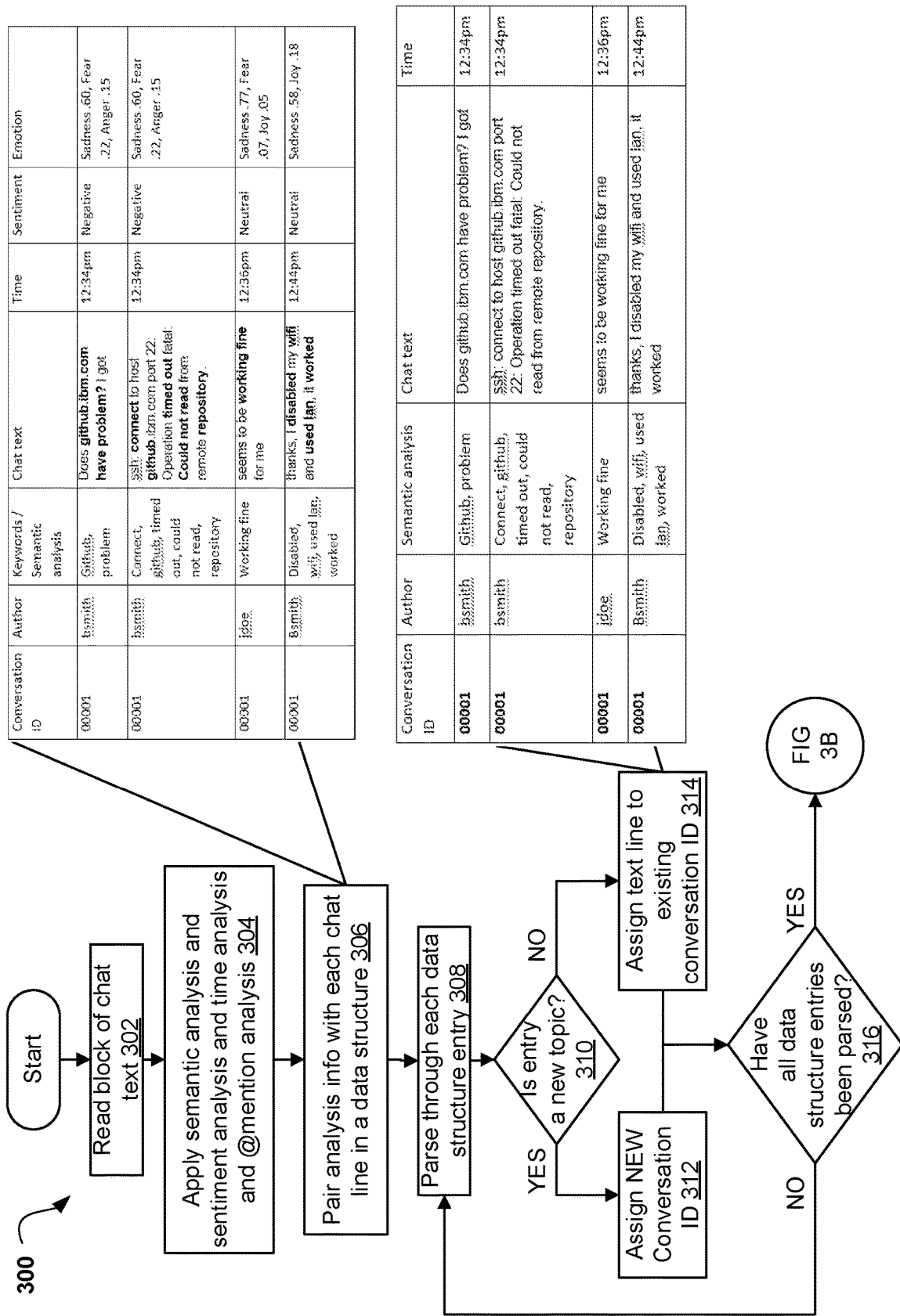
FIG. 3A is an operational flowchart illustrating a chat summarization and retrieval process according to at least one embodiment.

Referring now to FIG. 3A, an operational flowchart 300 further detailing step 204 of chat summarization and retrieval process 200 is presented according to at least one embodiment. Here, chat summarization program 110A, 110B may, upon reading a block of chat text at 302 using natural language processing techniques, apply at step 304 a semantic, sentiment, time, and mention analysis, where a semantic analysis may involve an examination of the logical meanings and relationships between words, the sentiment analysis may examine the emotional meanings and relationships between words, the time analysis may examine the general timeframe of the conversation (for example, whether it takes place over the course of minutes, hours, days, or weeks) as well as the individual times at which each comment was posted, and the mention analysis may examines the participants and mentioned keywords of the topic. At 306, the information returned from the analyses of step 304 may be paired with each chat line in a data structure, where the data structure may be a database or any other digital organizational paradigm. In alternate embodiments, the analysis information may be paired with individual words, sentences, phrases, paragraphs, or segment of natural language from the chat text conversation at any other level or levels of granularity upon which chat summarization program 110A, 110B can perform natural language analysis. At step 308, chat summarization program 110A, 110B parses through each entry of the data structure, where the entry may comprise the paired analysis info and natural language text. At step 310, chat summarization program 110A, 110B determines, based on the parsing of the entries, whether the entry corresponds with a new topic; chat summarization program 110A, 110B determines if the entry corresponds to a new topic by, for example, using natural language techniques to identify the topic of the chat text, and checking this topic against existing topics already stored in the data structure to reveal if the topic is new or if it has already been identified. If the entry does correspond with a new topic, at step 312 chat summarization program 110A, 110B assigns a new conversation ID to the entry. If the entry does not correspond with a new topic, at 314 chat summarization program 110A, 110B assigns the chat text line, or the entry as a whole, to an existing conversation ID. At 316, chat summarization program 110A, 110B determines whether all data structure entries have been parsed, for example by iterating through the data structures seriatim and decrementing each new data entry against the total number of data entries. If all data structure entries have not been parsed, chat summarization program 110A, 110B returns to step 308 to continue parsing through data structure entries. If all data structure entries been parsed, chat summarization program 110A, 110B advances to step 320 of FIG. 3B.

Figure 3B:
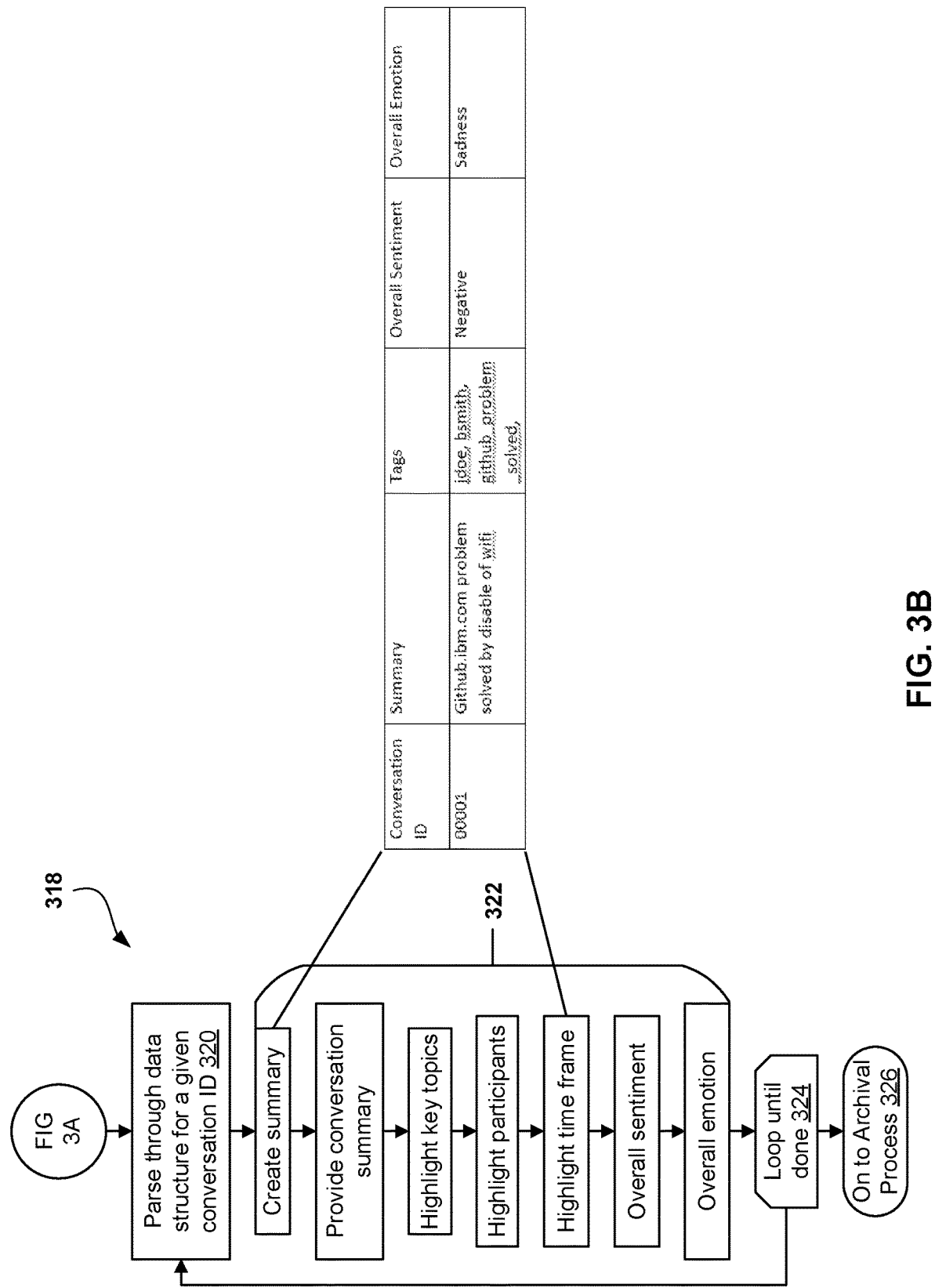
FIG. 3B is an operational flowchart illustrating a chat summarization and retrieval process according to at least one embodiment.

Referring now to FIG. 3B, an operational flowchart 302 further detailing step 206 of chat summarization and retrieval process 200 is presented according to at least one embodiment. Here, at step 320, chat summarization program 110A, 110B parses through the data structure for a given conversation ID. As an example, chat summarization program 110A, 110B may start with the first conversation ID and iterate through them one by one. At step 322, chat summarization program 110A, 110B may generate metadata for the conversation ID; the creation of metadata may involve generating a summary, providing the conversation summary (for example, by making it available to parse by the user), and highlighting salient features of the conversation such as key topics, participants, time frame, sentiment (or 'overall sentiment'), and overall emotion, where highlighting may include making the features bold, italicized, tagging the features, or otherwise making the features more available for search and identification by a user. Emotion may be any feeling evoked by the topic assigned to the conversation ID. In some embodiments, sentiment may be measured, where sentiment may be the overall mental attitude produced by the emotion, such as positive or negative. At 324, chat summarization program 110A, 110B continues to loop through steps 320-322, until all data structures have been parsed for a given conversation ID. At 326, chat summarization program 110A, 110B may move on to an archival process, wherein chat summarization program 110A, 110B stores the data structure and generated metadata for later access.

It may be appreciated that FIGS. 2-3 provides only an illustration of implementation and do not imply any limitations with regard to how different embodiments may be implemented. Many modifications to the depicted environments may be made based on design and implementation requirements.

Figure 4:
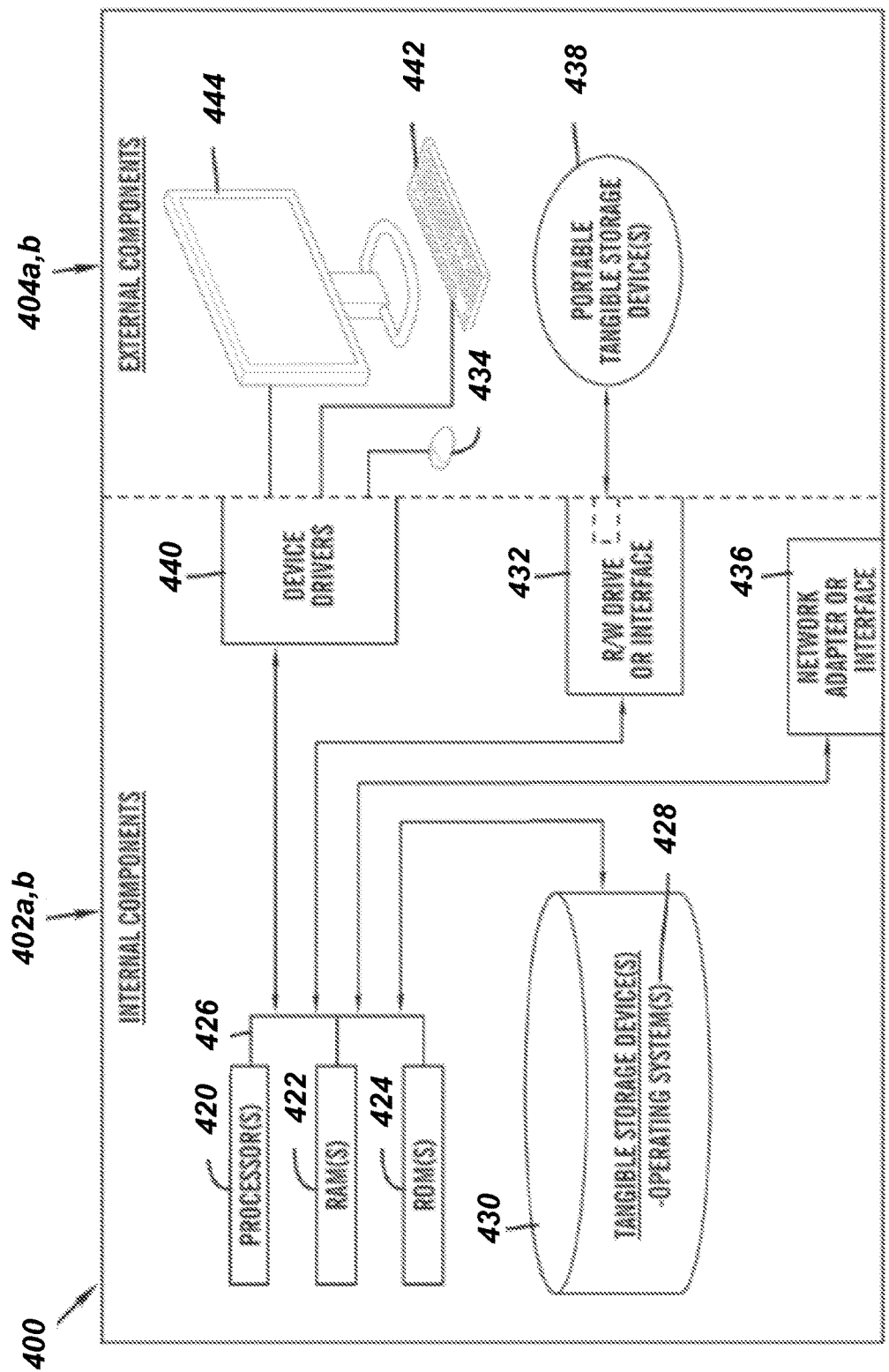
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the collaborative chat program 108 and the chat summarization program 110A in the client computing device 102, and the chat summarization program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the chat summarization program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The collaborative chat program 108 and the chat summarization program 110A in the client computing device 102 and the chat summarization program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the collaborative chat program 108 and the chat summarization program 110A in the client computing device 102 and the chat summarization program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
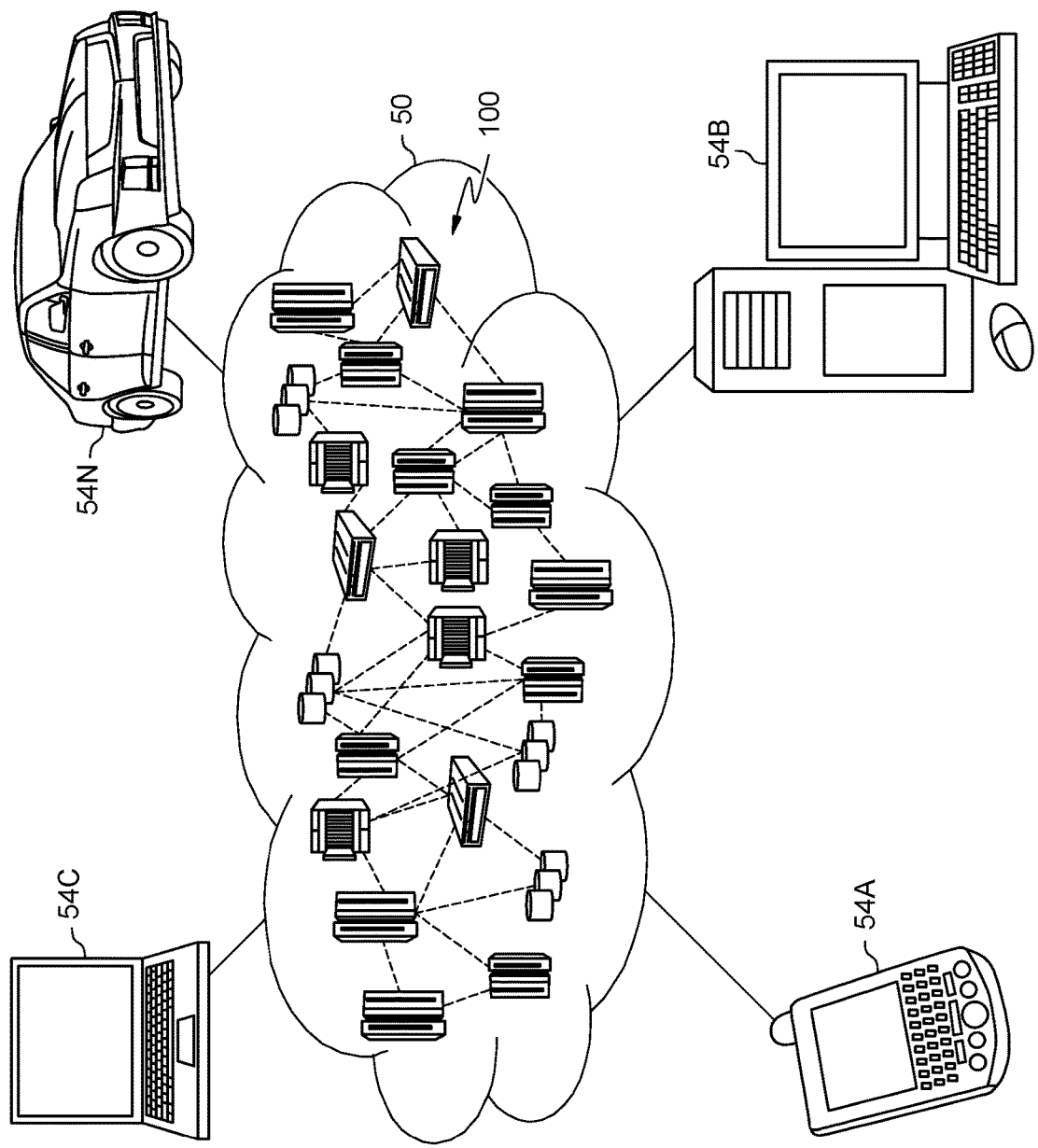
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
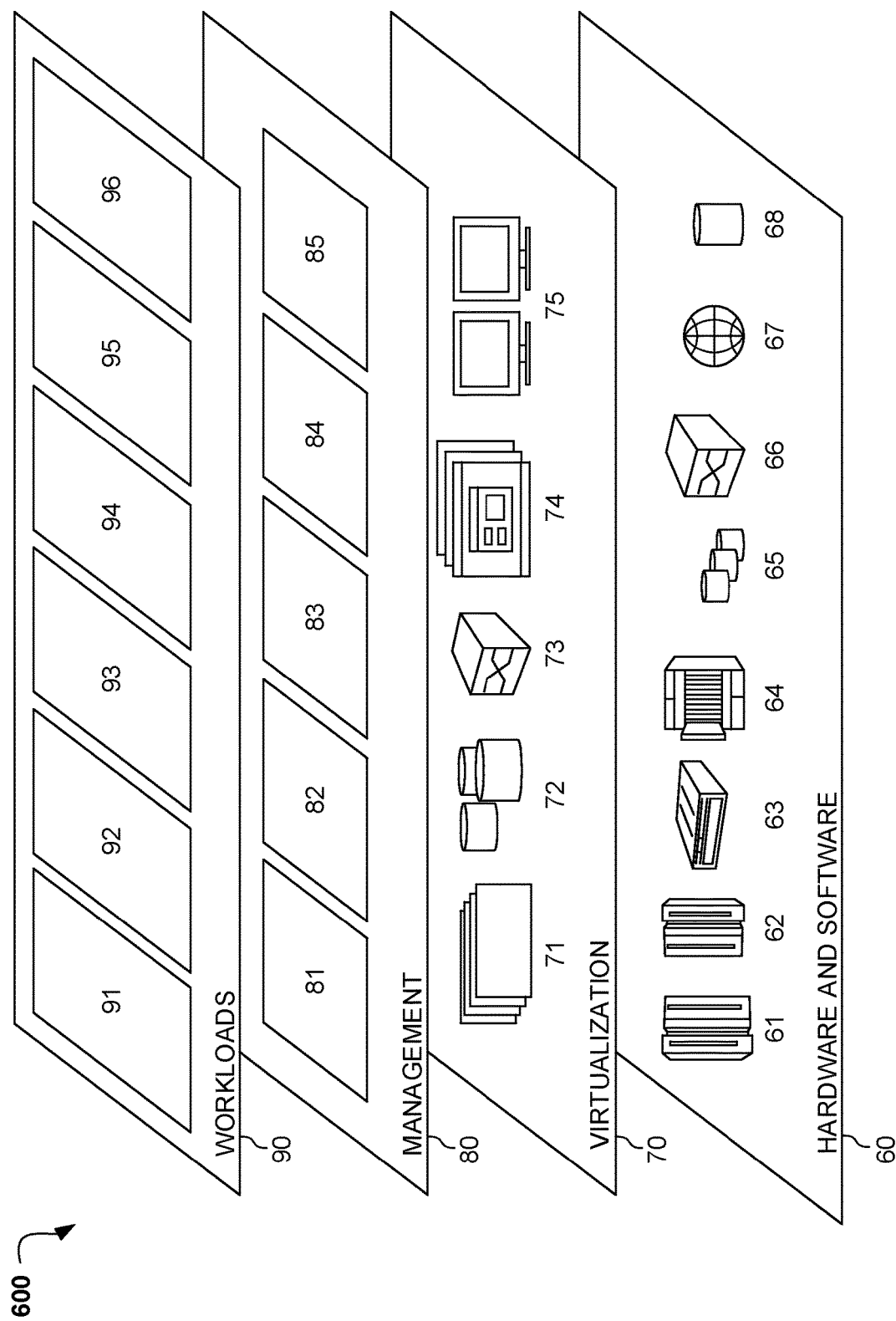
FIG. 6 depicts abstraction model layers of the cloud computing environment of FIG. 5, according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and chat summarization and retrieval 96. Chat summarization and retrieval 96 may relate to cognitively summarizing and retrieving archived chat communications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for summarizing and processing a plurality of chat text, the method comprising:

responsive to receiving a query in a chat text application, grouping a plurality of chat texts in chat text search results into one or more conversations according to logical classifications of the chat texts, wherein the logical classifications are based on a plurality of chat text topics and a plurality of metadata associated with the chat texts; and assigning, based on sentiment analysis of the plurality of chat texts, an overall emotion and an overall sentiment to the one or more conversations, wherein the overall emotion may be a feeling evoked by at least one of the chat text topic assigned to at least one of the logical classifications, and wherein the overall sentiment may be an overall mental attitude produced by the overall emotion.

2. The method of claim 1, wherein the one or more topics relate to a topic of conversation, and each topic is associated with a unique identifier.

3. The method of claim 1, further comprising:
building the plurality of metadata based on the one or more chat text topics.

4. The method of claim 1, further comprising:
assigning one or more values to the plurality of chat texts based on detected emotional analysis of the plurality of chat texts.

5. The method of claim 4, further comprising:
assigning, based on the one or more values, an overall emotion to at least one topic of the plurality of chat texts.

6. The method of claim 4, further comprising:
assigning, based on one or more values, a sentiment to at least one topic of the plurality of chat texts.

7. The method of claim 1, wherein the plurality of metadata is selected from a list consisting of:
summaries, emotions, overall emotions, sentiments, and tags.

8. A computer system for summarizing and processing a plurality of chat text, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

responsive to receiving a query in a chat text application, grouping a plurality of chat texts in chat text search results into one or more conversations according to logical classifications of the chat texts, wherein the logical classifications are based on a plurality of chat text topics and a plurality of metadata associated with the chat texts; and assigning, based on sentiment analysis of the plurality of chat texts, an overall emotion and an overall sentiment to the one or more conversations, wherein the overall emotion may be a feeling evoked by at least one of the chat text topic assigned to at least one of the logical classifications, and wherein the overall sentiment may be an overall mental attitude produced by the overall emotion.

9. The computer system of claim 8, wherein the one or more topics relate to a topic of conversation, and each topic is associated with a unique identifier.

10. The computer system of claim 8, further comprising:
building the plurality of metadata based on the one or more chat text topics.

11. The computer system of claim 8, further comprising:
assigning one or more values to the plurality of chat texts based on detected emotional analysis of the plurality of chat texts.

12. The computer system of claim 11, further comprising:
assigning, based on the one or more values, an overall emotion to at least one topic of the plurality of chat texts.

13. The computer system of claim 11, further comprising:
assigning, based on one or more values, a sentiment to at least one topic of the plurality of chat texts.

14. The computer system of claim 8, wherein the plurality of metadata is selected from a list consisting of:
summaries, emotions, overall emotions, sentiments, and tags.

15. A computer program product for summarizing and processing a plurality of chat text, the computer program product comprising:
one or more computer-readable tangible storage medium and program instructions stored on at least one of the one or more tangible storage medium, the program instructions executable by a processor to cause the processor to perform a method comprising:
responsive to receiving a query in a chat text application, grouping a plurality of chat texts in chat text search results into one or more conversations according to logical classifications of the chat texts, wherein the logical classifications are based on a plurality of chat text topics and a plurality of metadata associated with the chat texts; and
assigning, based on sentiment analysis of the plurality of chat texts, an overall emotion and an overall sentiment to the one or more conversations, wherein the overall emotion may be a feeling evoked by at least one of the chat text topic assigned to at least one of the logical classifications, and wherein the overall sentiment may be an overall mental attitude produced by the overall emotion.

16. The computer program product of claim 15, wherein the one or more topics relate to a topic of conversation, and each topic is associated with a unique identifier.

17. The computer program product of claim 15, further comprising:
building the plurality of metadata based on the one or more chat text topics.

18. The computer program product of claim 15, further comprising:
assigning one or more values to the plurality of chat texts based on detected emotional analysis of the plurality of chat texts.

19. The computer program product of claim 18, further comprising:
assigning, based on the one or more values, an overall emotion to at least one topic of the plurality of chat texts.

20. The computer program product of claim 18, further comprising:
assigning, based on one or more values, a sentiment to at least one topic of the plurality of chat texts.

* * * * *